United States Patent [19]
Wilson

[11] 4,370,796
[45] Feb. 1, 1983

[54] BALE WAGON

[76] Inventor: Leon R. Wilson, Box 1612, Kalispell, Mont. 59901

[21] Appl. No.: 177,332

[22] Filed: Aug. 12, 1980

Related U.S. Application Data

[63] Continuation-in-part of Ser. No. 36,574, May 7, 1979, abandoned, and a continuation-in-part of Ser. No. 81,717, Oct. 3, 1979, abandoned.

[51] Int. Cl.³ .............................................. A01D 87/12
[52] U.S. Cl. ..................................... 29/564.3; 83/433; 83/563; 83/909; 414/38; 414/44; 414/68; 414/501; 414/544; 414/412
[58] Field of Search ............... 414/38, 39, 44, 111, 414/68, 70, 71, 330, 412, 501, 542, 544, 555; 83/433, 563, 909; 29/564.3

[56] References Cited

U.S. PATENT DOCUMENTS

| | | | |
|---|---|---|---|
| 2,820,282 | 1/1958 | Schneider | 83/909 X |
| 3,278,050 | 10/1966 | Tarbox | 414/44 |
| 3,515,292 | 6/1970 | Oborny | 414/44 X |
| 3,625,376 | 12/1971 | McWilliams | 414/68 X |
| 3,631,992 | 1/1972 | Dickinson | 414/39 X |
| 3,756,428 | 9/1973 | White | 414/44 |
| 3,918,595 | 11/1975 | Godfrey et al. | 414/44 X |
| 3,944,274 | 3/1976 | Mott et al. | 294/107 X |
| 4,015,726 | 4/1977 | Baker | 414/555 |
| 4,119,218 | 10/1978 | Guenon et al. | 414/44 X |

*Primary Examiner*—Leslie J. Paperner
*Attorney, Agent, or Firm*—John J. Byrne

[57] ABSTRACT

Disclosed is a bale wagon comprising a bed upon which bales are stored and a tower mounted on the bed for receiving a bale or bales, lifting the bale(s) to a selected height, and moving the bale(s) longitudinally of the bed length, depositing same on the bed or on a partially formed load already on the bed and wherein said tower can retrieve said bales from said load and eject them from said bed.

12 Claims, 28 Drawing Figures

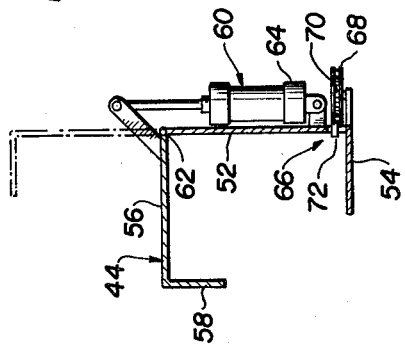
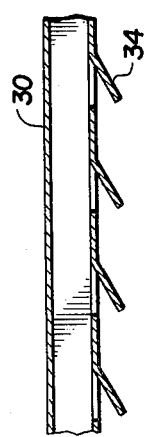
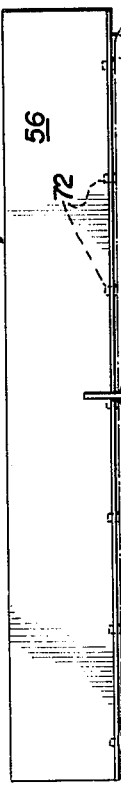
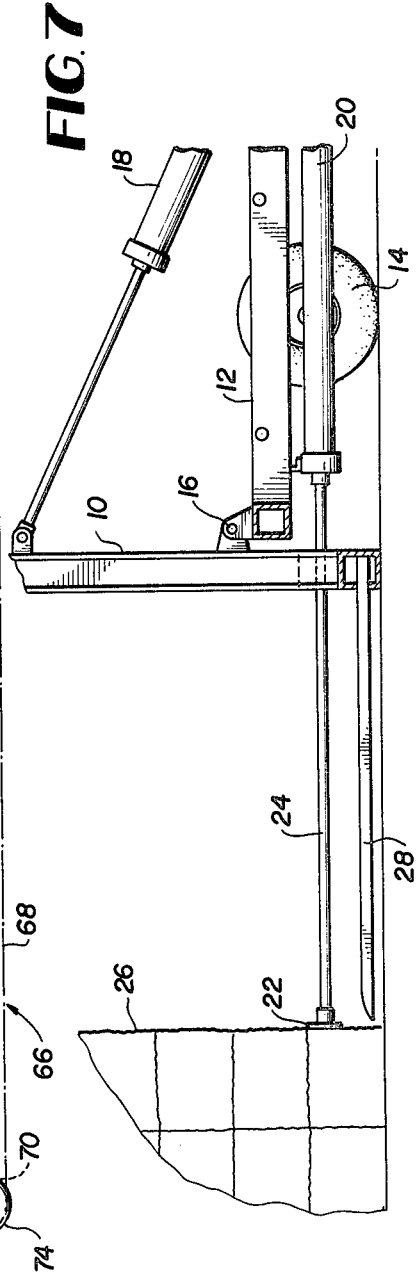

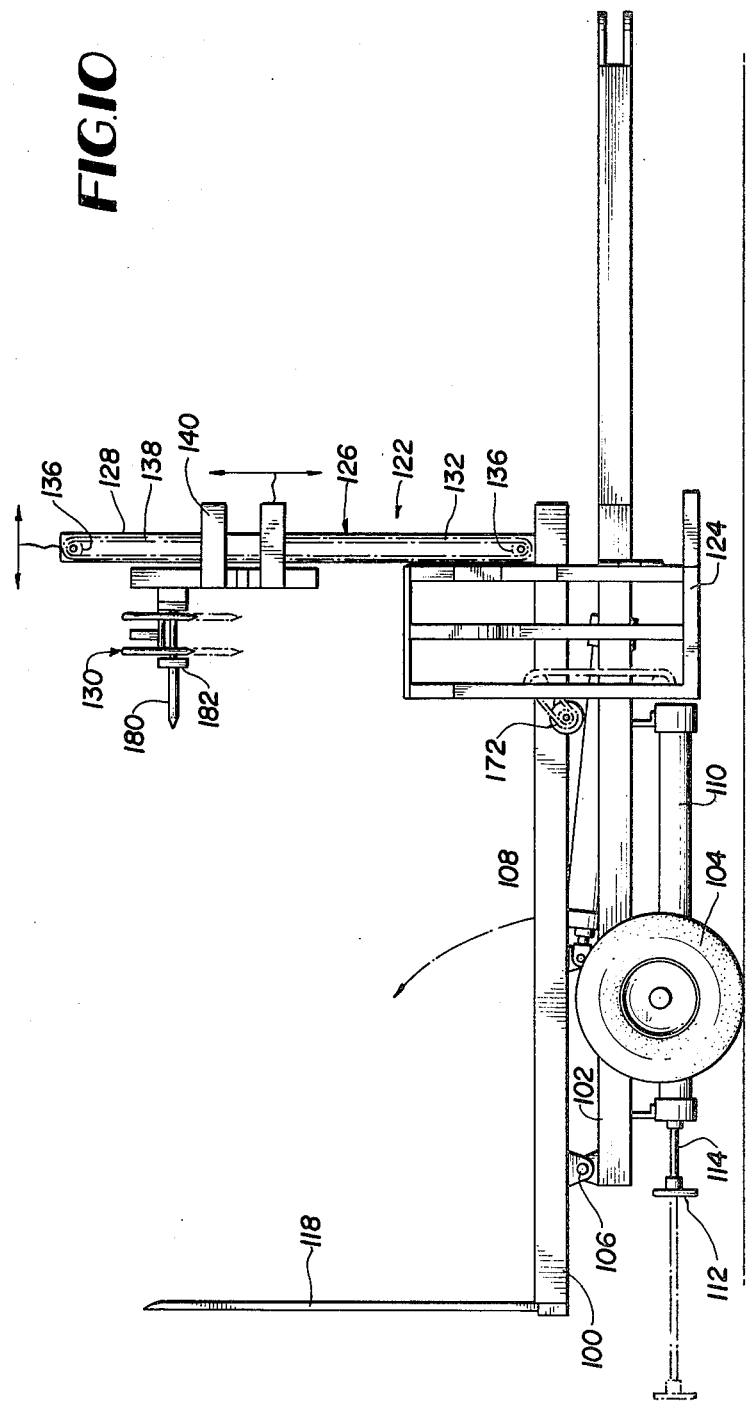

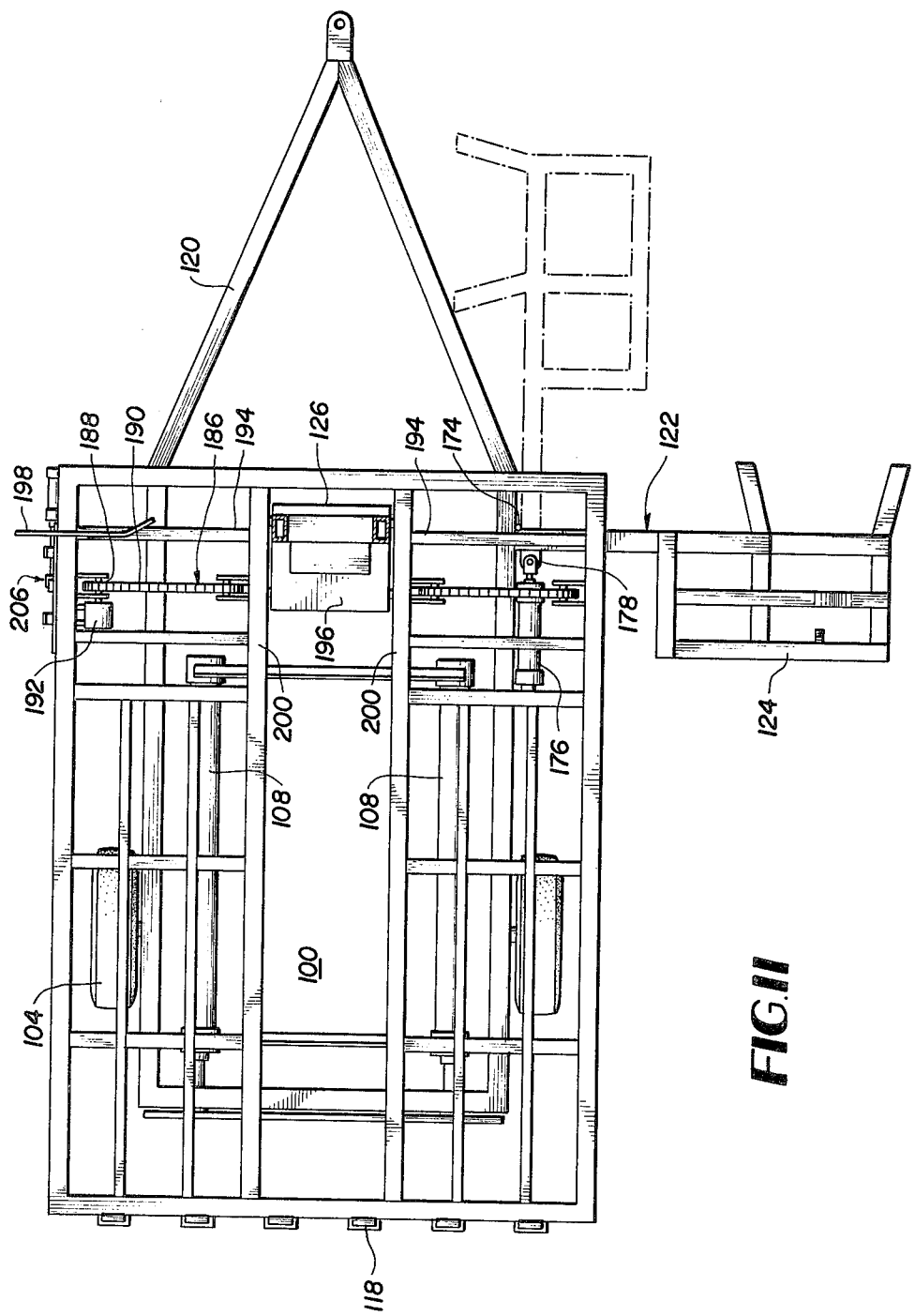

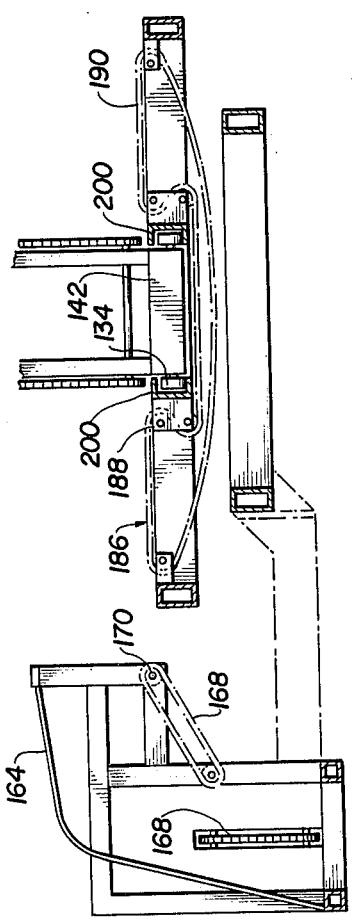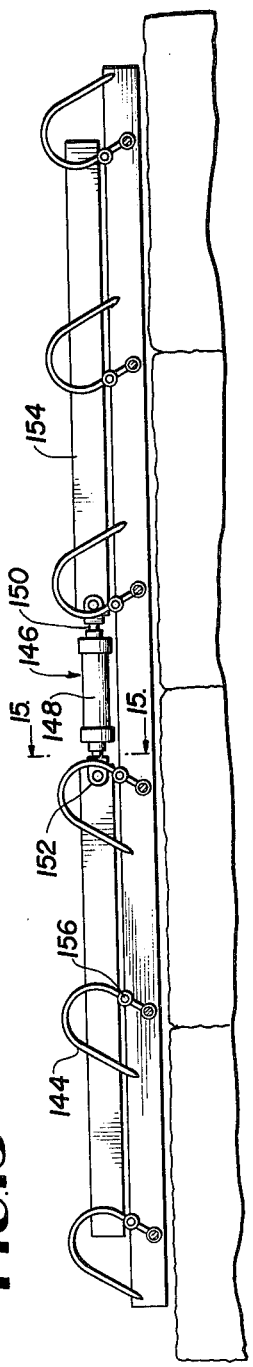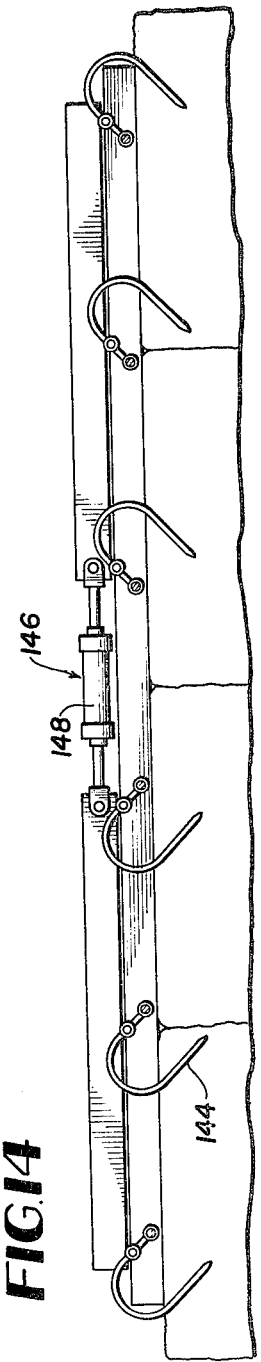

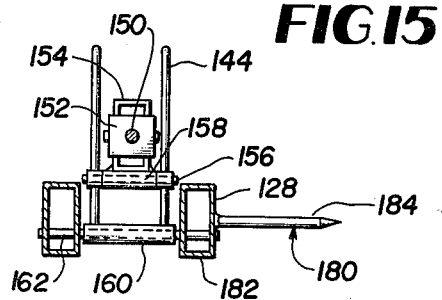
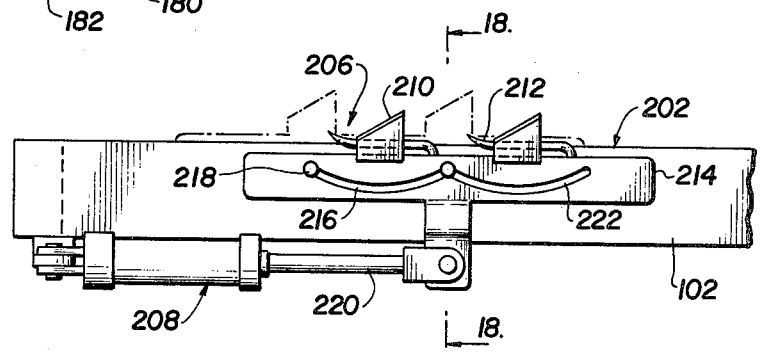
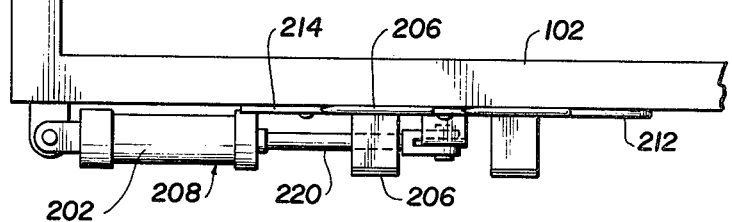

BALE WAGON

CROSS-REFERENCE TO RELATED APPLICATIONS

This application is a continuation-in-part of application Ser. No. 36,574, filed May 7, 1979, and of application Ser. No. 81,717, filed Oct. 3, 1979, both abandoned.

TECHNICAL FIELD

This application relates to a type of farm vehicle known as a bale wagon. Such vehicles are typically adapted to be drawn by a farm tractor, and they are used to load, convey, and dispense bales of hay.

BACKGROUND OF THE INVENTION

In many conventional bale wagons, vertical slices of bales (e.g., a four-by-four array) are formed at the front of the bale wagon. Then, two flat tables mounted at the front of the bale wagon are pivoted from the horizontal to the vertical, at which point they engage the front surface of the vertical slice. The flat tables then translate rearwardly, pushing the vertical slice and any previously loaded vertical slices into position against tines which move backwardly in the bale wagon as it is loaded. The flat tables then return to the front of the bale wagon and are pivoted out of the way, after which the procedure is repeated to load the next slice. As will be appreciated, the bale wagon is thus loaded from front to back.

When the bale wagon is full, the bed is pivoted about an axis at the rear of the wagon to unload the entire load of hay. However, the bale wagon cannot be unloaded a bale at a time (except manually). That is, there is no mechanism permitting the procedure to be reversed, feeding the stacked bales forward and offloading a bale at a time. Additionally, the apparatus for mounting and pivoting the flat tables is heavy and cumbersome, taking up a significant portion of the bale wagon length which could otherwise be used for transporting bales.

OBJECTS OF THE INVENTION

It is, therefore, a general object of the invention to provide a bale wagon which will obviate or minimize problems of the type previously described.

It is a particular object of the invention to provide such a device which will load from back to front.

It is a further object of the invention to provide such a device which can be unloaded a bale at a time by feeding the stacked bales forwardly and offloading them from the front a bale at a time.

It is yet a further object of the invention to provide such a device in which the bale loading and unloading apparatus takes up little of the bale wagon length.

It is a still further object of the invention to provide such a device which is inexpensive to manufacture, sturdy in use, and not given to malfunctions or parts failures.

Other objects and advantages of the present invention will become apparent from the detailed descriptions of two preferred embodiments set forth hereinafter taken in conjunction with the accompanying drawings.

BRIEF SUMMARY OF THE INVENTION

The subject invention is a bale wagon comprising (a) a bed on which bales can be stored and (b) a tower mounted on the bed for receiving a bale at the front of the bed, lifting it a selected height, and moving it towards the rear of the bed, where it is deposited on the bed or on a partially formed load already on the bed.

BRIEF SUMMARY OF THE DRAWINGS

FIG. 5 is a cross-sectional view on an enlarged scale along the line 5—5 in FIG. 3.

FIG. 6 is a cross-sectional view on an enlarged scale along the line 6—6 in FIG. 2.

FIG. 7 is a fragmentary view of the rear of the bale wagon shown in FIG. 1, showing it in its unloading position.

FIG. 8 is a fragmentary view showing the bale pusher mechanism.

FIG. 10 is a side view of the bale wagon shown in FIG. 9.

FIG. 11 is a plan view with the mast frame in section of the bale wagon shown in FIG. 9.

FIG. 12 is a cross-sectional view along the line 12—12 in FIG. 9.

FIG. 13 is a cross-sectional view along the line 13—13 in FIG. 9 showing the hooks in their release position.

FIG. 14 is a view similar to FIG. 13, but showing the hooks in their gripping position.

FIG. 15 is a cross-sectional view along the line 15—15 in FIG. 13.

FIG. 16 is a side view of the binder cutting mechanism used with the present invention.

FIG. 17 is a plan view of the binder cutting mechanism shown in FIG. 16.

FIG. 18 is a cross-sectional view along the line 18—18 in FIG. 16.

DETAILED DESCRIPTION OF THE PRESENTLY PREFERRED EMBODIMENTS

First Embodiment

Figure 1:
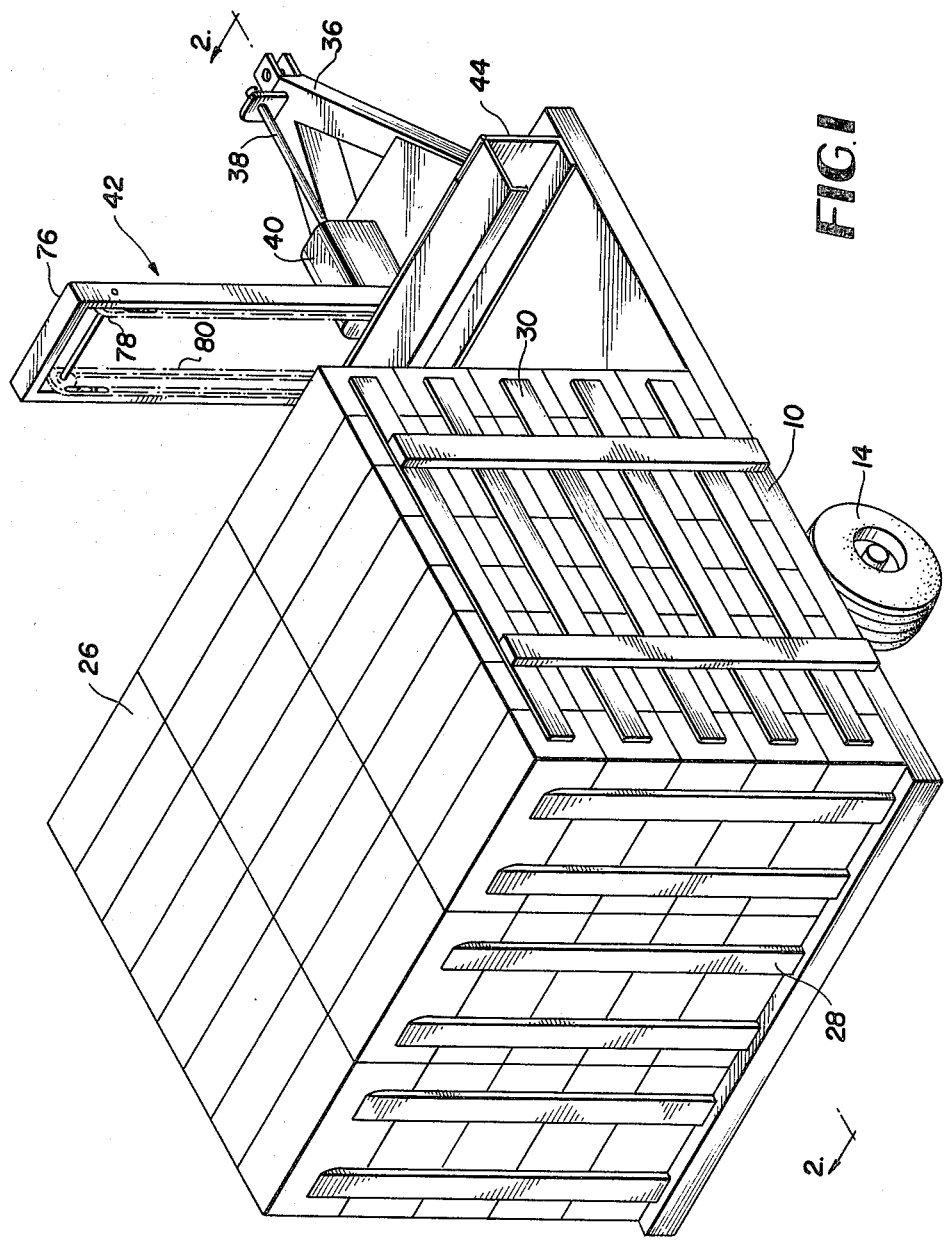
FIG. 1 is a perspective view of a first embodiment of a bale wagon according to the present invention.
Figure 2:
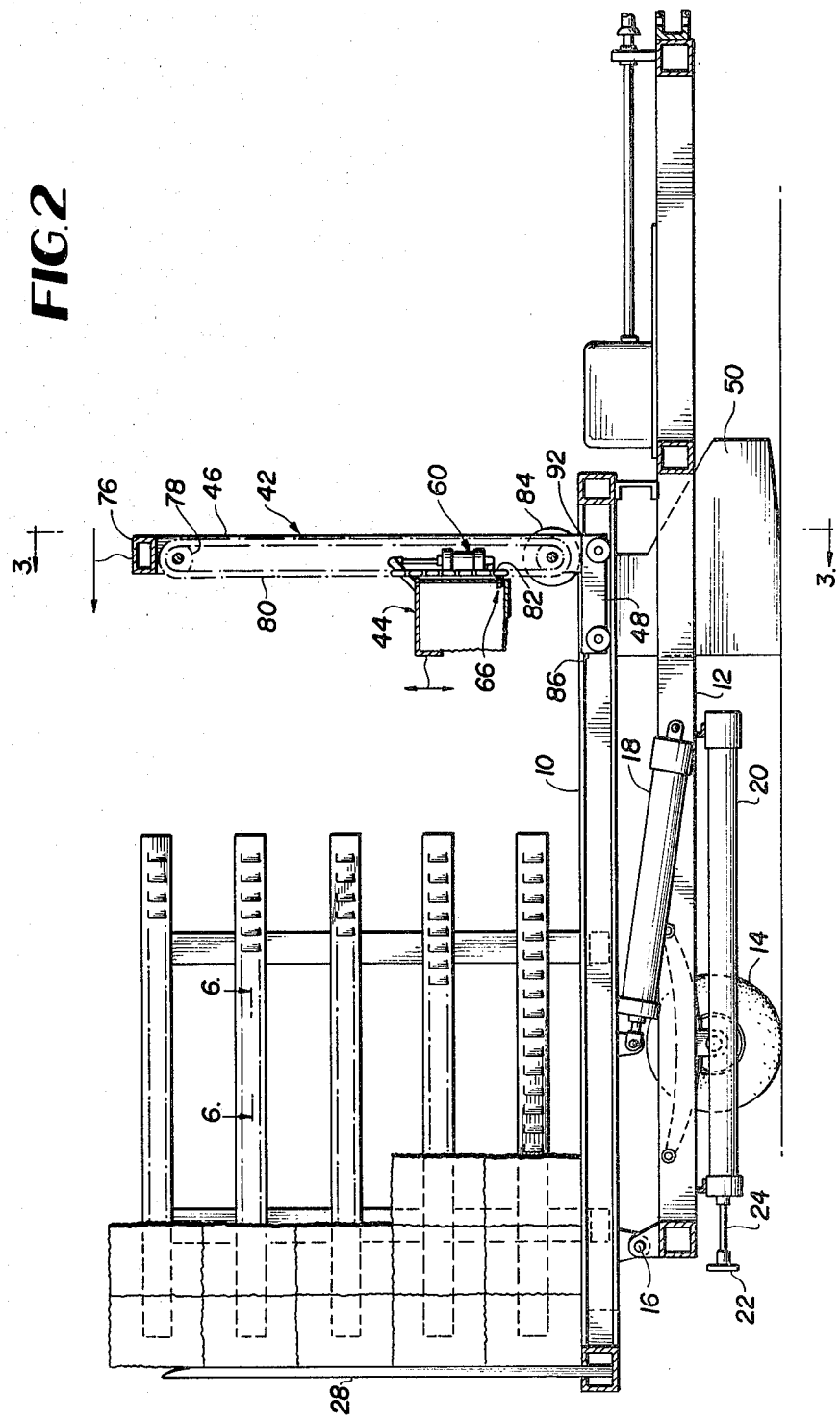
FIG. 2 is a cross-sectional view along the line 2—2 in FIG. 1.

The bale wagon shown in FIGS. 1 and 2 comprises a bed 10 mounted on an undercarriage 12 which is in turn mounted on wheels 14. As is conventional, the bed 10 is pivoted on the undercarriage 12 at 16, and a jack 18 is provided to pivot the bed 10 about the pivot 16 (as shown in FIG. 7) to unload the contents of the bale wagon en masse or to load the bale wagon by picking up an entire stack of previously stacked bales. An offloading mechanism including a jack 20 mounted on the undercarriage 12 and having a flat pushing surface 22 on the end of its rod 24 is provided to push stacked bales 26 off the tines 28 when the bale wagon is in the position shown in FIG. 7.

The tines 28, which are statically mounted in the bed 10, form the rear of the enclosure for stacked bales 26. Side walls 30, which are horizontally adjustable via jacks 32 to accomodate different sized bales and to facilitate frontal off-loading, form the sides of the enclosure for stacked bales 26. As shown in FIG. 6, pressed in teeth 34 are provided in the side walls 30 so that bales can be pushed backwards in the bale wagon, but will not come forward while the side walls 30 are pulled in.

A trailer hitch 36 and a power take-off device 38 are provided at the front of the bale wagon. The power take-off device 38 is adapted for connection to a farm tractor (not shown) which also draws the bale wagon via the trailer hitch 36, and the power take-off device 38 provides power to a hydraulic motor 40 which is used to power the various hydraulic devices on the bale wagon.

The bale wagon shown in FIGS. 1 and 2 also comprises a bale handling mechanism 42 mounted on the bed 10 for receiving a bale at the front of the bed 10, lifting it to a selected height, and moving it toward the rear of the bed 10, where it is deposited on the bed 10 or on a partially formed load already on the bed. Broadly speaking, the bale handling mechanism 42 including a bale envelope 44 shaped to receive and temporarily retain at least one bale, an elevator mechanism 46 for moving the bale envelope 44 vertically relative to the bed 10, and a horizontal transport mechanism 48 for moving the bale envelope 44 horizontally between the front and rear of the bed 10.

Figure 3:
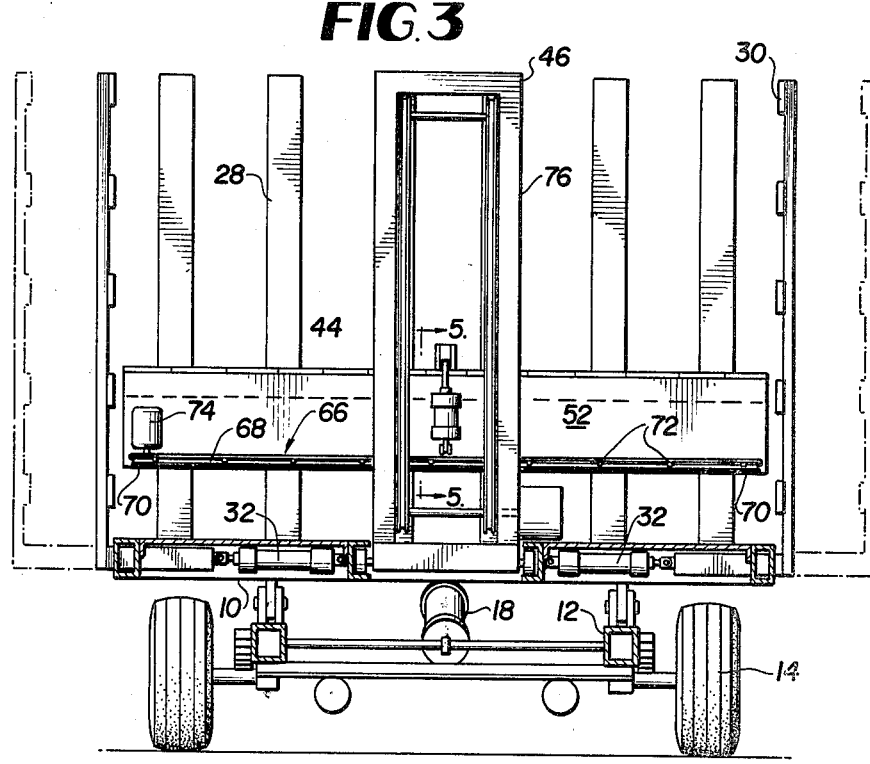
FIG. 3 is a cross-sectional view along the line 3—3 in FIG. 2.
Figure 4:
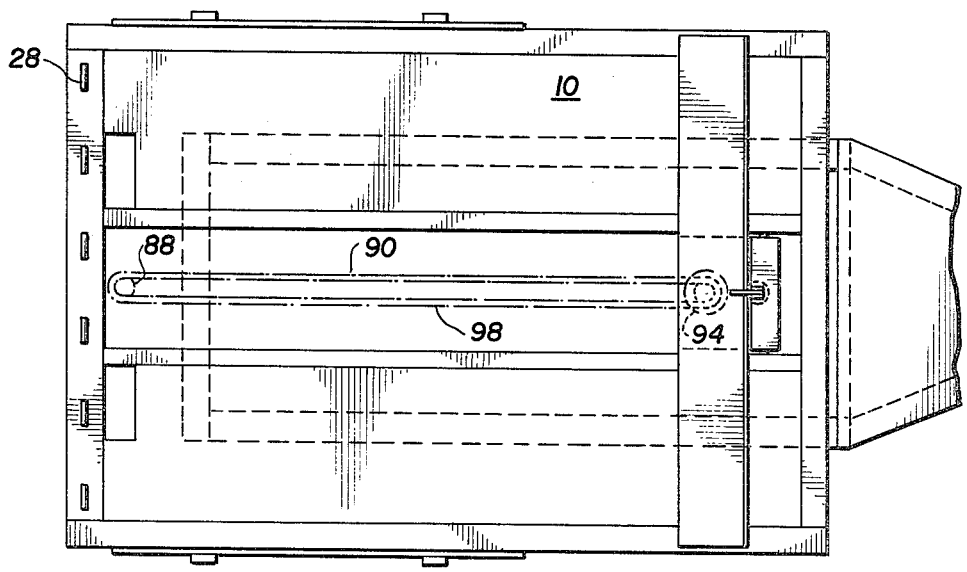
FIG. 4 is a bottom plan view of the bed of the bale wagon shown in FIG. 1, with parts omitted for the sake of clarity.

As best seen in FIG. 5, the bale envelope 44 is open on either side transverse to the bed 10 and is shaped to contact four sides of a bale while it is being carried by the bale envelope 44. A conventional bale pick-up 50 (shown only in FIG. 2) or a novel bale pick-up as illustrated in connection with the second embodiment are provided to scoop bales of hay up from the field and to feed them into one of the transversely open ends of the bales envelope 44. In either case, the bale pick-up is stationarily mounted at the front of the bed 10—that is, it does not translate longitudinally along the side of the bed 10. As best seen in FIGS. 1 and 3, the bale envelope 44 extends substantially the transverse width of the bed 10 and is adapted to receive a plurality of bales in end-to-end array. The bale envelope 44 itself including a back 52 positioned vertically and transversely to the bed 10, a bottom shelf 54 positioned horizontally and transversely to the bed 10 and adapted to support a bale in the bale envelope 44, a top 56 positioned horozontally and transversely to the bed 10 and adapted to overlie a bale in the bale envelope 44, a front lip 58 positioned vertically and transversely to the bed 10 and adapted to hold a bale in the bale envelope 44 against the back 52, and a mechanism 60 for opening the bale envelope 44 to eject or receive a bale longitudinally of the bed 10. Preferably, and as shown, the front lip 58 depends from the top 56, the top 56 is pivotally mounted at 62 on the back 52, and the mechanism 60 includes a pivotally mounted jack 64, for pivoting the back 52 relative to the top 56.

The illustrated bale wagon further includes a mechanism 66 for moving a bale in the bale envelope 44 transversely to the bed 10 during individual off-loading. (During individual (or unit) loading, each incoming bale pushes the preceding bale ahead of it in the bale envelope 44.) As best seen in FIG. 8, the mechanism 66 preferably including an endless chain 68 passed about two sprockets 70 mounted in the back 52, carrying dogs 72 over half its length, and powered by a motor 74. Alternatively, spring-loaded dogs which permit bales to be pushed over the dogs in one direction but not the other and which are carried over the entire length of the chain might be used.

The elevator mechanism 46 includes a centrally mounted tower 76, at least two sprockets 78 mounted for rotation on the tower 76, a chain 80 trained over the sprockets 78, apparatus 82 attaching the bale envelope 44 to the chain 80, and a motor 84 for driving the chain 80. The horizontal transport mechanism 48 includes a dolly 86, at least two sprockets 88 mounted for rotation on the bed 10, a chain 90 trained over the sprockets 88, apparatus 92 for attaching the bale envelope 44 to the chain 90, and a motor 94 for driving the chain 90. Preferably, the tower 76 is carried by the dolly 86, as shown, and in that case the tower 76 and the apparatus 82 become parts of the apparatus 92. As for the motor 84 and 94, they derive their power from hydraulic motor 40 by conventional means which are not shown.

Appropriate hydraulic control circuitry, operable from either the bale wagon or the tractor (or both) are provided to permit selective energization of the jack 18, the jack 20, the jacks 32, the jack 64, the motor 74, the motor 84, and the motor 94.

Operation of the First Embodiment

In operation, a plurality of bales are fed into the bale envelope 44 by the bale pick-up 50 and fed transversely therethrough by contact with the succeeding bale until the bale envelope 44 is filled with a row of bales. Bale envelope 44 is then lifted to a selected height by the elevator mechanism 46 and moved towards the rear of the bed 10 by the horizontal transport mechanism 48, where it is deposited on the bed 10 or on a partially formed load already on the bed 10 by using the mechanism 60 to open the bale envelope 44. The bale envelope is then returned to the front of the bale wagon, where the process is repeated until the bale wagon is full. As will be appreciated, this process results in the bale wagon's being loaded from back to front.

When the bale wagon is full, it can be unloaded either en masse, by pivoting the bed 10 backwards as is conventional, or a bale at a time. The latter feat is accomplished by actuating the jacks 32 to push out the side walls 30, thereby releasing the stack of bales 26, then using the elevator mechanism 46 to raise the bale envelope 44 to the height of the top row of bales, using the horizontal transport mechanism 48 to translate the bale envelope 44 to the stack of bales 26, using the mechanism 60 to open the bale envelope 44, forcing the top row of bales onto the bottom shelf 54 of the bale envelope 44, using the mechanism 60 to close the bale envelope, using the horizontal transport mechanism 48 to translate the bale envelope forward away from the stack of bales 26, using the elevator mechanism 46 to drop the bale envelope 44 to its lowermost position, and then using the mechanism 66 to feed the bales out of the bale envelope 44 one at a time.

Second Embodiment

Figure 9:
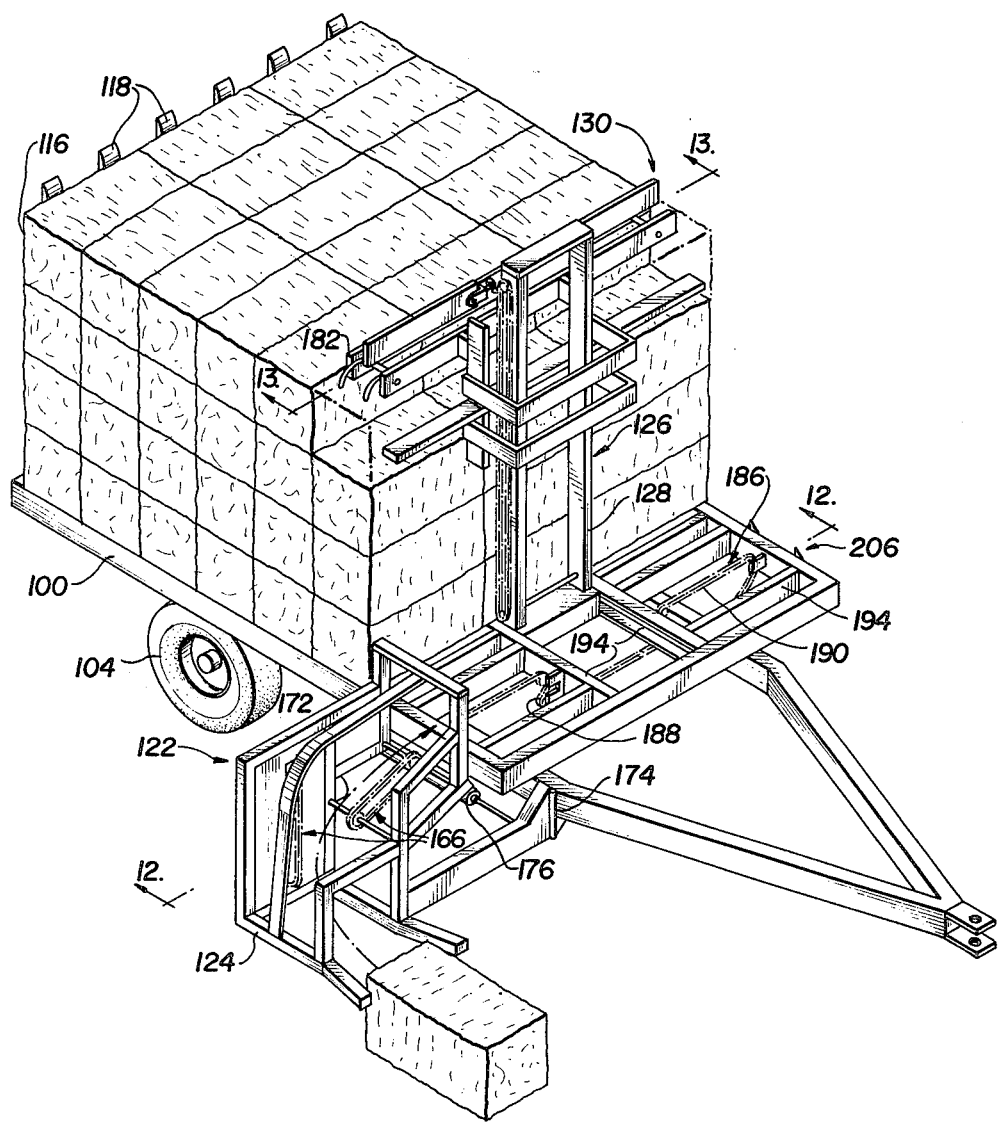
FIG. 9 is a perspective view (with parts broken away for ease of explanation) of a second embodiment of a bale wagon according to the present invention.
Figure 24:
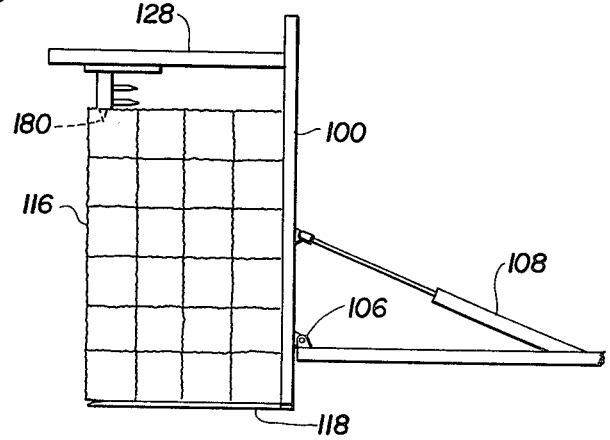
Figure 25:
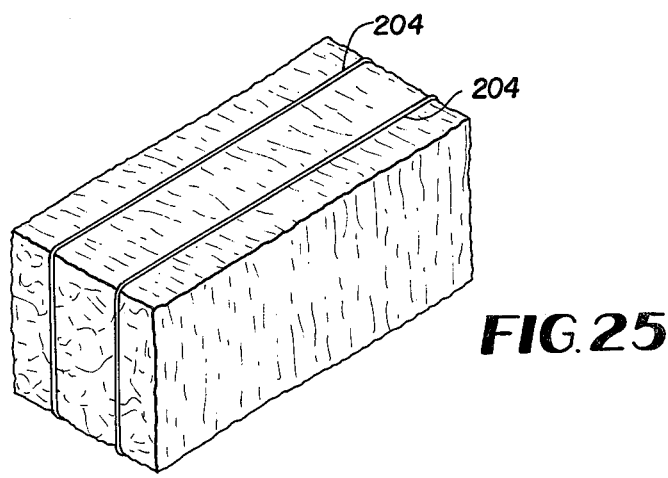
FIG. 25 is a perspective view of a bale of hay showing the twine to be cut by the binder cutting mechanism.

The bale wagon shown in FIGS. 9—11 comprises a bed 100 mounted on an undercarriage 102 which is in turn mounted on wheels 104. As is conventional, the bed 100 is pivoted on the undercarriage 102 at 106, and a pair of jacks 108 are provided to pivot the bed 100 about the pivot 106 (as shown in FIG. 24) to unload the contents of the bale wagon en masse or to load the bale wagon by picking up an entire stack of previously stacked bales. An offloading mechanism including a jack 110 mounted on the undercarriage 102 and having a flat pushing surface 112 on the end of its rod 114 is provided to push stacked bales 116 off the tines 118 when the bale wagon is in the position shown in FIG. 24.

The tines 118, which are mounted in the bed 100, form the rear of the enclosure for stacked bales 116. Although not shown in FIGS. 9-11, side walls may be provided to form the sides of the enclosure for stacked bales 116, and, if so, they are preferably horizontally adjustable, as are the side walls 30 in the first embodiment.

A trailer hitch 120 and a power take-off device (not shown) are provided at the front of the bale wagon. The power take-off device is adapted for connection to a farm tractor (not shown) which also draws the bale wagon via the trailer hitch 120, and the power take-off device provides power to a hydraulic motor (not shown) which is used to power the various hydraulic devices on the bale wagon.

The bale wagon shown in FIGS. 9-11 also comprises a bale handling mechanism 122 mounted on the bed 100 for receiving a bale, lifting it to a selected height, and depositing it on the bed 100 or on a partially formed load already on the bed. As with the first embodiment, the bale handling mechanism 122 includes a bale pick-up 124 mounted on the bed 100 for receiving bales at ground level and lifting them to approximately the height of the bed 100 and apparatus 126 mounted on the bed 100 for receiving bales from the bale pick-up 124, lifting them to a selected height above the bed 100, and moving them towards the rear of the bed 100. The bale pick-up 124 is stationarily mounted at the front end of the bed 100—that is, it does not translate longitudinally along the side of the bed 100. However, as indicated in FIG. 11 and discussed hereinafter, it may be pivoted to a carry position (shown in broken line in FIG. 11). The apparatus 126, on the other hand, is mounted for longitudinal movement back and forth between the front and rear of the bed 100.

Also as with the first embodiment, the apparatus 126 including a frame 128 centrally mounted on the bed 100, a grappler assembly 130 mounted on the tower 128 for receiving and temporarily retaining at least one bale, an elevator mechanism 132 for moving the grappler assembly 130 vertically relative to the bed 100, and a horizontal transport mechanism 134 (shown in FIG. 12) for moving the tower 128 horizontally back and forth between the front and rear of the bed 100. The elevator mechanism 132 include at least two sprockets 136 mounted for rotation on the tower 128, a chain 138 trained over the sprockets 136, apparatus 140 for attaching the grappler assembly 130 to the chain 138, and a motor (not shown in this embodiment, but preferably similar to the motor 84 shown in the first embodiment) for driving the chain 138. The horizontal transport mechanism 134 may include a dolly 142, at least two sprockets mounted for rotation on the bed 100, a chain, and a motor for driving the chain. Although the sprockets, chain, and the motor for driving the chain are not shown in this embodiment, they are preferably similar to the sprockets 88, the chain 90, and the motor 92 shown in the first embodiment. Preferably the tower 128 is carried by the dolly 142, as shown, and in that case the tower 128 and the apparatus 140 become parts of the grappler assembly 130.

As best seen in FIGS. 13 and 14, the grappler assembly 130 includes a plurality of pivotably mounted hooks 144 and apparatus 146 for pivoting the hooks 144 about their axes. At least one hook 144, and preferably several hooks 144, are mounted on each side of the vertical axis of the tower 128, and the apparatus 146 causes the hooks 144 to pivot towards and away from the vertical axis of the tower 128. As illustrated in FIG. 14, when the hooks 144 are pivoted towards the vertical axis of the tower 128, they embed themselves deeply in bales of hay which have been pre-positioned to be picked up by this means, and in practice it has been found that the hooks 144 have no difficulty in picking up and maneuvering the largest bales of hay commonly used.

The apparatus 146 preferably includes a double-acting hydraulic cylinder 148 operatively connected to the hooks 146 via cylinder rods 150, clevises 152, gang bars 154, and pivoting pins 156 carried by the gang bars 154 in bearing sleeves 158 and extending through bearing surfaces (not shown) in the hooks 144. The hooks 144 are preferably fixedly attached to bearing sleeves 160 which receive fixed pins 162 which extend through bearing surfaces (not shown) in the tower 128. As will be appreciated, actuation of the hydraulic cylinder 148 causes the gang bars 154 to move in an arcuate path, since the pivoting pins 156 remain a fixed distance from the fixed pins 162. Of course, many other linkage arrangements are possible, but the illustrated linkage has been found in practice to be eminently satisfactory.

Figure 19:
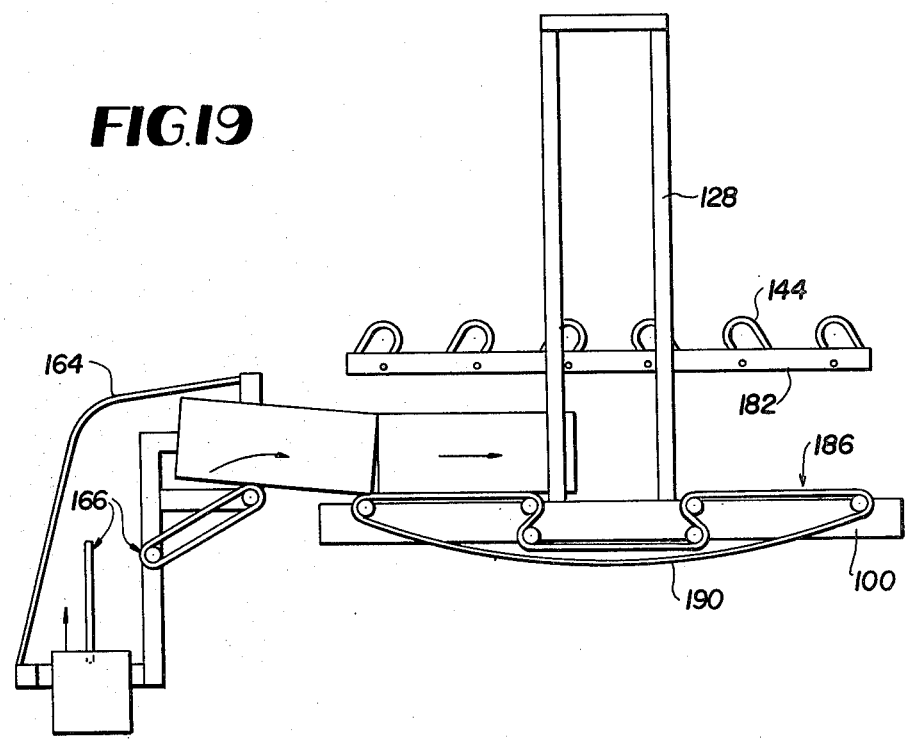
FIG. 19 is a partially schematic illustration of the bale loading mechanism used with the present invention and of one of the preferred bale transporting mechanisms.
Figure 20:
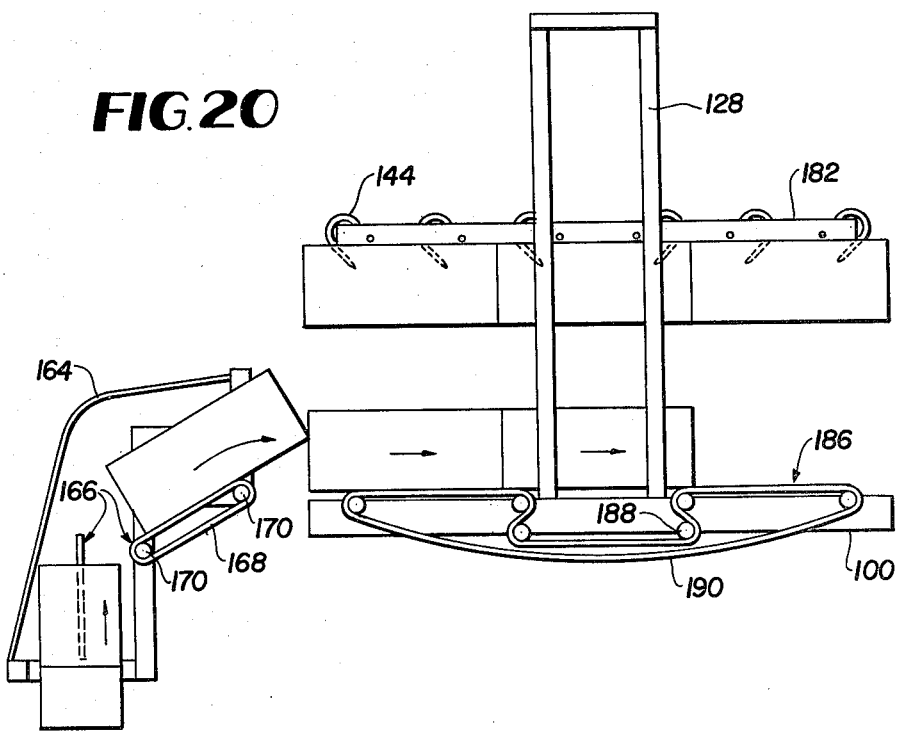
FIG. 20 is a view similar to FIG. 19 but showing a subsequent stage of the loading procedure.
Figure 21:
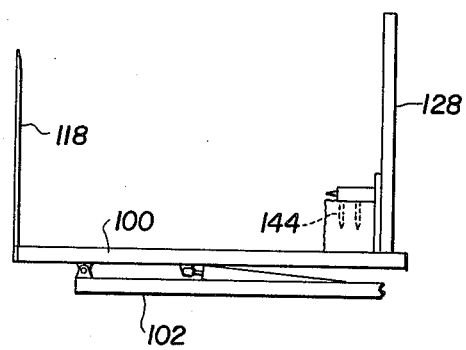
FIGS. 21 through 24 are highly schematic illustrations showing the loading procedure and the load-dumping procedure.
Figure 22:
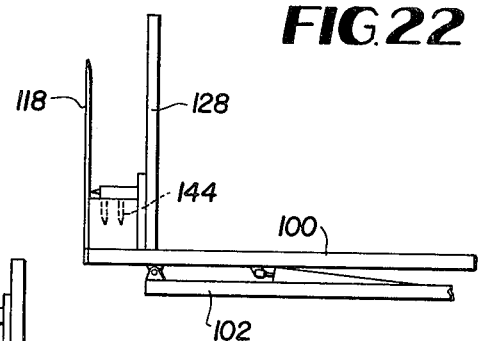

The bale pick-up 124 includes a bale receiving chute 164 and an elevator mechanism 166 for conveying bales through the chute 164. (For ease of explanation, the bale pick-up 124 is shown with the chute 164 removed in FIG. 9. However, the chute 164 is shown in FIGS. 12, 19, and 20.) The elevator mechanism 166 includes at least one (and preferably several) continuous conveyors the working runs of which protrude into the chute 164. As best seen in FIG. 12, the elevator mechanism 166 preferably includes a plurality of teethed chains 168 trained over a plurality of sprockets 170 and a motor 172 for driving the chains 168.

Returning to FIGS. 9 and 11, it will be seen that the chute 164 is pivotably mounted on axle 174 at the front end of the bed 100. This permits the chute 164 to be pivoted back and forth between a work position (shown in solid line in FIG. 11) and a carry position (shown in broken line in FIG. 11). A jack 176 is provided to pivot the chute 164 via a short bellcrank 178.

Figure 23:
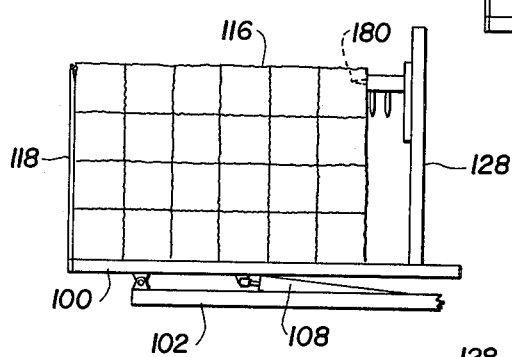

The second embodiment also include apparatus 180 carried by the tower 128 for holding a load of bales against the tines 118. The apparatus 180 preferably includes a boom 182 which is mounted on the tower 128 and a plurality of spikes 184 mounted on the boom 128 and extending towards the tines 118. (Alternatively, the boom 182 may be considered to be a part of the tower 128, as it was during discussion of the hooks 144.) The use of the apparatus 180 is illustrated in FIGS. 23 and 24. As shown therein, the tower 128 can be moved backward to drive the spikes 184 into the upper forward row of bales prior to extension of the jack 108 to tilt the bed 100. This holds the load 116 solidly against the tines 118 during the tilting operation, preventing toppling of the load 116 during mass unloading. Similarly, during mass loading, the tines 118 can be driven under a load 116, the tower 128 moved vertically downwardly to drive the spikes 184 into the upper leftward (in FIG. 24) row of bales prior to retraction of the jack 108 to tilt the bed 100. This again holds the load 116 solidly against the tines 118 during the tilting operation, preventing toppling of the load 116.

As with the first embodiment, the second embodiment comprises a mechanism 186 for moving bales horizontally across the bed from the loading side (i.e., the side having the chute 164) to the off-loading side (i.e., the opposite side). The mechanism 186 includes at least two sprockets 188 mounted for rotation on the bed 100, a chain 190 trained over the sprockets 188, a motor 192 for driving the chain 190, a plurality of cross members 194 for supporting the bales as they slide transversely across the bed 100, a shelf 196 extending rearwardly from the tower 128 for the same purpose, and an off-loading guide 198. The mechanism 186 is positioned at the front of the bed 100 and, except for the shelf 196, does not translate longitudinally of the bed 100. Although not illustrated in the second embodiment, the chain 190 preferably carries a plurality of dogs similar to the dogs 72 illustrated in FIG. 8. Only the working runs of the chain 190 (one on either side of guides 200 for the dolly 142) and/or the dogs 72 protrude above the cross members 194.

The second embodiment also includes a binder cutting mechanism 202 (illustrated in FIGS. 16-18) for cutting the binder 204 (such as wire or twine) around bales of hay when it is desired to "flake" the bales during off-loading. The binder cutting mechanism 202 includes a gripper 206 for holding a portion of binder 204 taut and an actuating mechanism 208 for moving blades 210 against a portion of binder 204 being held taut by the gripper 206. The upper ends of the blades 210 are below the upper surface of the bed 100 (except while cutting the binder) so as not to interfere with the movement of bales. As illustrated, the gripper 206 preferably includes hooks 212 mounted on a vertically movable plate 214 and positioned to grip portions of binder 204 between the hooks 212 and the plate 214 when the plate 214 is in its upper position. The upper ends of the hooks 212 are also below the upper surface of the bed 100 except during a cutting operating so as not to interfere with movement of the bales.

The actuating mechanism 208 preferably includes a cam 216 and a cam follower 218 one of which is operatively connected to the blades 210, and a jack 220 for moving the cam 216 relative to the cam follower 218. In the illustrated embodiment, the cam follower 218 is a pair of pins fixedly mounted on the undercarriage 102, the cam 216 is a curved groove or slot 222 in the plate 214 sized and shaped to receive the pins, the blades 210 are mounted on the plate 214, and the jack 220 is operatively connected to the plate 214. However, many other cam and cam follower arrangements could be used instead of the illustrated arrangement.

Operation of the Second Embodiment

Individual unit loading is illustrated schematically in FIGS. 19-22. It is believed that the individual unit loading operation will be clear from these illustrations and the previous detailed description of the operation of the first embodiment. However, it should be pointed out that FIG. 20 shows a row of bales gripped and elevated by the hooks 144 at the same time that another bale is being pushed across beneath them on the bed 100. This is actually a combination of two stages of the loading procedure, for in actual practice the row of bales would have been deposited on the load before the next bale would be picked up.

As for FIGS. 23 and 24, which illustrate mass loading and unloading, they have been described previously in connection with the description of apparatus 180.

Figure 26:
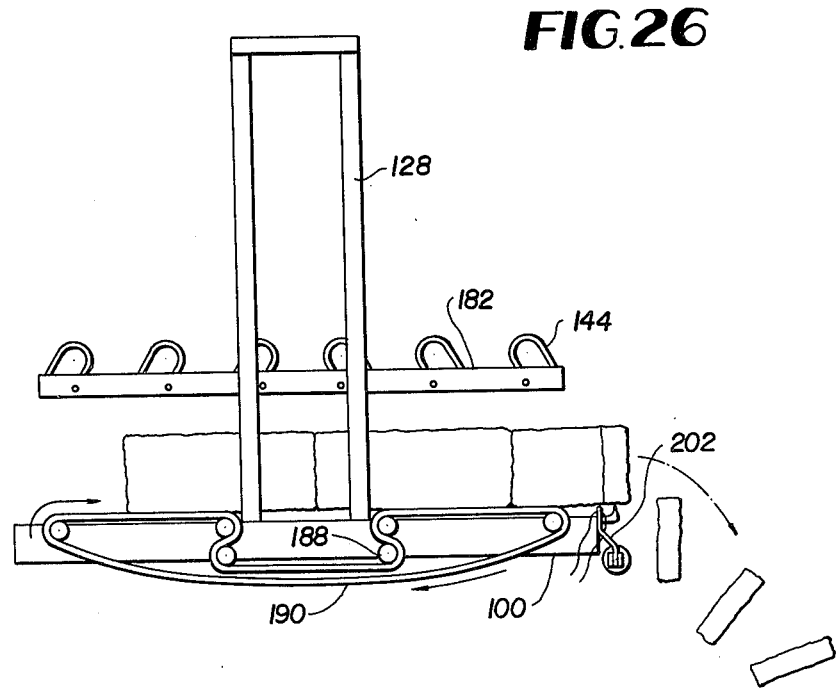
FIG. 26 is a highly schematic cross-sectional view showing bales of hay being off-loaded in flake form.

FIG. 26 illustrates individual offloading of bales and the flaking of bales by the binder cutting mechanism 202.

Third Embodiment

Figure 27:
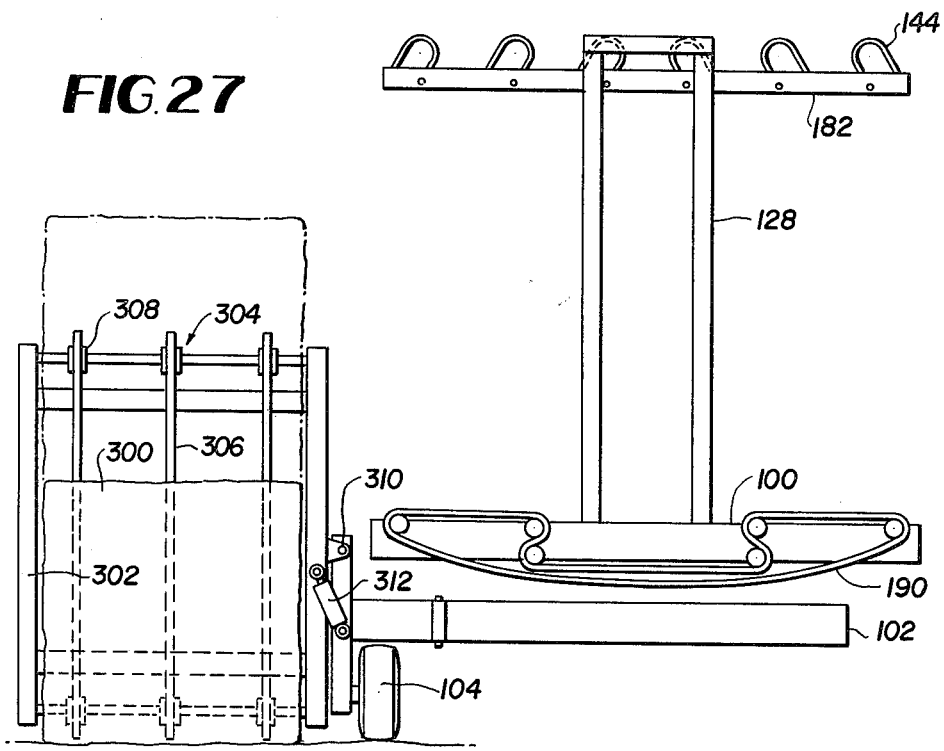
FIG. 27 is a highly schematic cross-sectional view showing a third embodiment of the present invention receiving an oversize bale.
Figure 28:
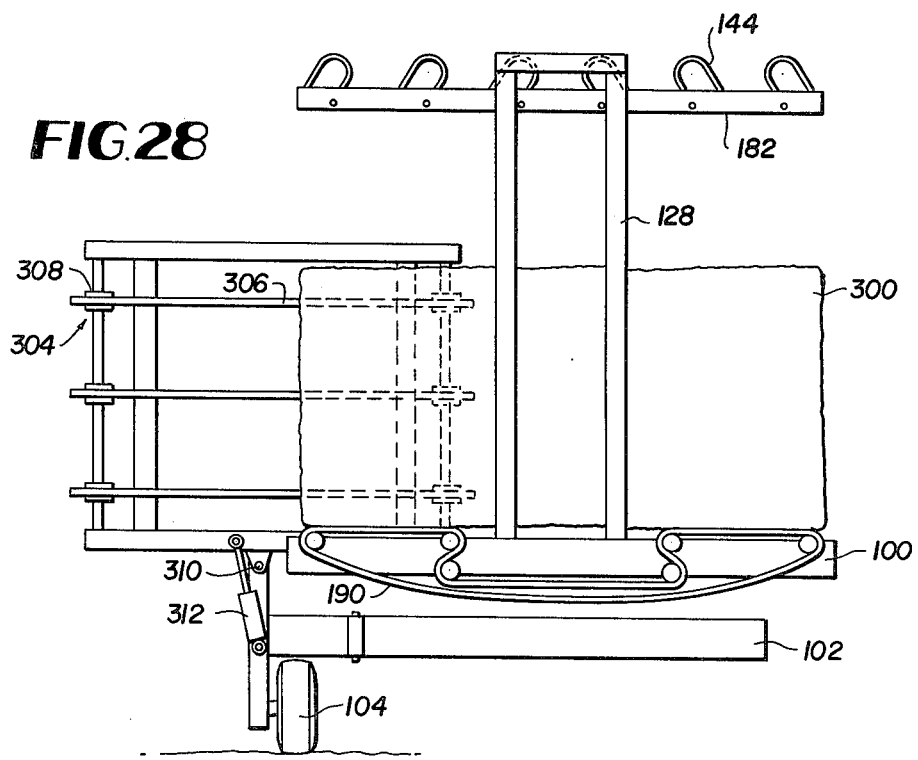
FIG. 28 is a highly schematic cross-sectional view showing the third embodiment lifting an oversize bale into the bed.

FIGS. 27 and 28 show a third embodiment of the subject invention in highly schematic form. This embodiment is particularly adapted for use with oversize bales of hay—that is, bales which are too large to be lifted on to the bed 100 by means of the chains 166 of the second embodiment. In this embodiment, an oversize bale 300 is received in a chute 302 pivotably attached to the undercarriage 102 as the bale wagon is pulled forward along the ground. The bale 300 is shown in solid line in FIG. 27 lying with one of its major faces on the ground, which is how they are normally positioned on the ground. An elevator mechanism 304 is provided within the chute 302 for pivoting the bale 300 to the position shown in broken line in FIG. 27, in which one of the bale 300's minor faces is parallel to the ground. The elevator mechanism 304 includes at least one (and preferably several) continuous conveyors the working runs of which protrude into the chute 302. As with the second embodiment, the continuous conveyors preferably include a plurality of teethed chains 306 trained over sprockets 308 and a motor (not shown) for driving the chains 306. As will be appreciated, forward motion of the bale wagon in combination with the effect of the elevator mechanism 304 and friction between the bale 300 and the ground causes the bale 300 to pivot to the position shown in broken line in FIG. 27.

After the bale 300 has pivoted to the position shown in broken line in FIG. 27, the chute 302 is pivoted about its axis 310 by means of a hydraulic jack 312 connected at one end to the chute 302 and at the other end to the undercarriage 102. Then, the elevator mechanism 304 is again activated to drive the bale 300 out of the chute 302 and onto the bed 100.

ADVANTAGES OF THE SUBJECT INVENTION

From the foregoing description of three embodiments of a bale wagon in accordance with the invention, those skilled in the art will recognize several advantages which singularly distinguish the subject invention from previously known devices. Some of those advantages are set forth below. However, while the following list of advantages is believed to be both accurate and representative, it does not purport to be exhaustive.

A particular advantage of the subject invention resides in its ability to load from back to front.

A further advantage of the subject invention is that it allows a load of bales to be unloaded a bale at a time by feeding the stacked bales forwardly and offloading them from the front of the bale wagon a bale at a time.

Yet a further advantage of the subject invention is that the bale loading and unloading apparatus takes up very little of the bale wagon length.

Still a further advantage of the subject invention is that the bale loading and unloading apparatus is inexpensive to manufacture, sturdy in use, and not given to malfunctions or parts failures.

Caveat

While the present invention has been illustrated by detailed descriptions of three preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. In a bale wagom comprising:
  (a) a generally rectangular and horizontal bed having at a front end thereof a bale reception area for receiving at least one bale;
  (b) a bale pick-up mounted on the side of said bed adjacent said reception area for receiving bales at ground level and depositing them on said reception area;
  (c) a vertical tower mounted on said bed
  (d) tower moving means for moving said tower forwardly and rearwardly along the longitudinal length of said bed said tower having a first position forward of said bale reception area;
  (e) a grappler assembly mounted on said tower for receiving and temporarily retaining at least one bale; and
  (f) grappler assembly moving means for moving said grappler assembly upwardly and downwardly along the vertical length of said tower,
the improvement wherein said bale wagon further comprises:
  (g) binder cutting means for cutting the binder around bales of hay, said binder cutting means comprising:
    (i) binder holding means for holding a portion of binder taut;
    (ii) a blade;
    (iii) a cam and cam follower one of which is operatively connected to said blade; and
    (iv) cam and/or cam follower moving means for moving said cam and said cam follower relative to each other, thereby moving said blade against a portion of binder being held taut by said binder holding means.

2. A bale wagon as recited in claim 1 wherein;
  (a) said cam follower is a fixedly mounted pin;
  (b) said cam is a plate having a curved groove or slot sized and shaped to receive said pin;
  (c) said blade is mounted on said plate; and
  (d) said cam and/or cam follower moving means is operative connected to said plate.

3. In a bale wagon comprising:
  (a) a generally rectangular and horizontal bed having at a front end thereof a bale reception area for receiving at least one bale, said bed being pivotable about a horizontal axis at its rear end, whereby it can be pivoted back and forth between a horizontal carrying position and a vertical loading and unloading position;
  (b) a bale pick-up mounted on the side of said bed adjacent said reception area for receiving bales at ground level and depositing them on said reception area;
  (c) a vertical tower centrally mounted on said bed;
  (d) tower moving means for moving said tower forwardly and rearwardly along the longitudinal length of said bed, said tower having a first position forward of said bale reception area;
  (e) a grappler assembly mounted on said tower for receiving and temporarily retaining at least one bale;
  (f) grappler assembly moving means for moving said grappler assembly upwardly and downwardly along the vertical length of said tower,
whereby bales deposited on said reception area by said bale pick-up can be received and temporarily retained by said grappler assembly, can be moved vertically along the length of said tower by said grappler assembly moving means and longitudinally along the length of said bed by said tower moving means while being temporarily retained by said grappler assembly and can be deposited on said bed or on a partially formed load already on said bed, the improvement wherein said bale wagon further comprises:
  (g) bed pivoting means for pivoting said bed back and forth between its horizontal and vertical positions;
  (h) a back mounted on said bed at the rear end thereof; and
  (i) bale holding means carried by said tower for holding a load of bales against said back.

4. A bale wagon as recited in claim 3 wherein said bale holding means comprises:
  (a) a boom horizontally mounted on said tower and
  (b) a plurality of spikes mounted on said boom and extending towards said back.

5. In a bale wagon comprising:
  (a) a generally rectangular and horizontal bed having at a front end thereof a bale reception area for receiving at least one bale said bed being pivotable about a horizontal axis at its rear end, whereby it can be pivoted back and forth between a horizontal carrying position and a vertical loading and unloading position;
  (b) a bale pick-up mounted on the side of said bed adjacent said reception area for receiving bales at ground level and depositing them on said reception area;
  (c) a vertical tower centrally mounted on said bed;
  (d) tower moving means for moving said tower forwardly and rearwardly along the longitudinal length of said bed, said tower having a first position forward of said bale reception area;
  (e) a grappler assembly mounted on said tower for receiving and temporarily retaining at least one bale;
  (f) grappler assembly moving means for moving said grappler assembly upwardly and downwardly along the vertical length of said tower,
whereby bales deposited on said reception area by said bale pick-up can be received and temporarily retained by said grappler assembly, can be moved vertically along the length of said tower by said grappler assembly moving means and longitudinally along the length of said bed by said tower moving means while being temporarily retained by said grappler assembly, and can be deposited on said bed or on a partially formed load already on said bed, the improvement wherein said bale wagon further comprises:

(g) bale moving means for moving bales horizontally across said bed.

6. A bale wagon as recited in claim 5 wherein said bale moving means comprises:

(a) at least two sprockets mounted for rotation on said bed;
(b) a chain trained over said sprockets; and
(c) chain driving means for driving 7. A bale wagon as recited in claim 6 wherein said bale moving means further comprises a plurality of pivoted one-way dogs carried by said chain.

8. In a bale wagon comprising:

(a) a generally rectangular and horizontal bed having at a front end thereof a bale reception area for receiving at least one bale:
(b) a bale pick-up mounted on the side of said bed adjacent said reception area for receiving bales at ground level and depositing them on said reception area;
(c) a vertical tower centrally mounted on said bed;
(d) tower moving means for moving said tower forwardly and rearwardly along the longitudinal length of said bed, said tower having a first position forward of said bale reception area;
(e) a grappler assembly mounted on said tower for receiving and temporarily retaining at least one bale;
(f) grappler assembly means for moving said grappler assembly upwardly and downwardly along the vertical length of said tower, whereby bales deposited on said reception area by said bale pick-up can be received and temporarily retained by said grappler assembly, can be moved vertically along the length of said tower by said grappler assembly moving means and longitudinally along the length of said bed by said tower moving means while being temporarily retained by said grappler assembly, and can be deposited on said bed or on a partially formed load already on said bed;

(g) binder cutting means for cutting the binder around bales of hay, said binder cutting means comprising:

(i) binder holding means for holding a portion of binder taut;
(ii) a blade; and
(iii) blade moving means for moving said blade against a portion of binder being held taut by said binder holder means the improvement wherein said blade moving means comprises:

(a) a cam and cam follower one of which is operatively connected to said blade and
(b) cam and/or cam follower moving means for moving said cam and said cam follower relative to each other.

9. A bale wagon as recited in claim 8 wherein said binder holding means comprises a hook positioned to grip portions of binder between said hook and an adjacent surface.

10. A bale wagon as recited in claim 8 wherein:

(a) said cam follower is a fixedly mounted pin;
(b) said cam is a plate having a curved groove or slot sized and shaped to receive said pin;
(c) said blade is mounted on said plate; and
(d) said cam and/or cam follower moving means is operatively connected to said plate.

11. In a bale wagon comprising:

(a) a generally rectangular and horizontal bed having at a front end thereof a bale reception area for receiving at least one bale;
(b) a bale pick-up mounted on the side of said bed adjacent said reception area for receiving bales at ground level and depositing them on said reception area, said bale pick-up comprising:
  (i) a bale receiving chute and
  (ii) bale conveying means for conveying bales through said chute;
(c) a vertical tower centrally mounted on said bed;
(d) tower moving means for moving said tower forwardly and rearwardly along the longitudinal length of said bed said tower having a first position forward of said bale reception area;
(e) a grappler assembly mounted on said tower for receiving and temporarily retaining at least one bale;
(f) grappler assembly moving means for moving said grappler assembly upwardly and downwardly along the vertical length of said tower, whereby bales deposited on said reception area by said bale pick-up can be received and temporarily retained by said grappler assembly, can be moved vertically along the length of said tower by said grappler assembly moving means and longitudinally along the length of said bed by said tower moving means while being temporarily retained by said grappler assembly, and can be deposited on said bed or on a partially formed load already on said bed; the improvement wherein:

(g) said chute is pivotably mounted at the front end of said bed whereby it can be pivoted back and forth between a lowered, bale receiving position and an elevated position in which a bale in said chute can be ejected onto said bale reception area.

12. A bale wagon as recited in claim 11 wherein said bale conveying means comprises at least one continuous conveyor the working run of which protrudes into said chute.

* * * * *